United States Patent
Damour et al.

[19]

[11] Patent Number: 6,132,096
[45] Date of Patent: Oct. 17, 2000

[54] BEARING BUSH AND METHOD FOR THE PRODUCTION THEREOF

[75] Inventors: Philippe Damour, Frankfurt; Klaus Kirchhof, Niedernhausen, both of Germany

[73] Assignee: Glyco-Metal-Werke Glyco B.V. & Co. KG, Germany

[21] Appl. No.: 09/216,890

[22] Filed: Dec. 18, 1998

[30] Foreign Application Priority Data

Dec. 20, 1997 [DE] Germany ............................ 197 57 021

[51] Int. Cl.[7] .................................................. F16C 33/72
[52] U.S. Cl. .............................................. 384/152; 384/16
[58] Field of Search .................................. 384/138, 151, 384/152, 153, 15, 16; 277/910

[56] References Cited

U.S. PATENT DOCUMENTS

| Re. 18,843 | 5/1933 | Skillman. | |
|---|---|---|---|
| 3,589,781 | 6/1971 | Hanley et al. | 384/152 |
| 3,850,483 | 11/1974 | Roberts et al. | 384/16 |
| 4,130,324 | 12/1978 | Becker | 384/152 |

FOREIGN PATENT DOCUMENTS

| 1342063A | 1/1963 | France. |
|---|---|---|
| 1854439 | 6/1962 | Germany. |
| 37017 | 6/1965 | Germany. |
| 6942955 U | 11/1969 | Germany. |
| 2518129 | 11/1976 | Germany. |
| 8906246 | 3/1990 | Germany. |
| 2207308A | 2/1992 | Germany. |
| 4340373A1 | 11/1993 | Germany. |
| 4401526C | 1/1994 | Germany. |

OTHER PUBLICATIONS

De–Buch Dubbel, Taschenbuch fur den Maschinenbau, 15. Auflage, Springer Verlag Berlin u.a., 1983, Seiten 959–974.

*Primary Examiner*—Thomas R. Hannon
*Attorney, Agent, or Firm*—Reising, Ethington, Barnes, Kisselle, Learman & McCulloch P.C.

[57] ABSTRACT

A bearing bush (1) having a groove (7) which has a curved contour and is located inside an annular bead (2) projecting outwards with respect to the bush body (6). A sealing member in the form of an o-ring (4) may be inserted into the groove (7). The bead for accommodating the sealing member is produced by an upsetting process.

7 Claims, 4 Drawing Sheets

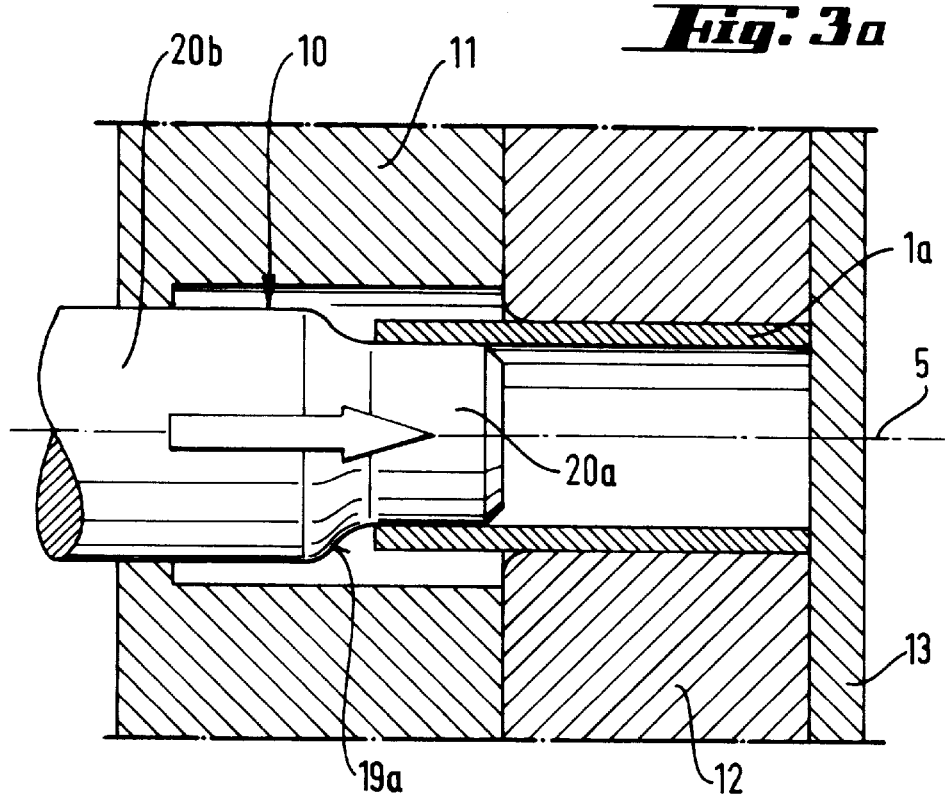
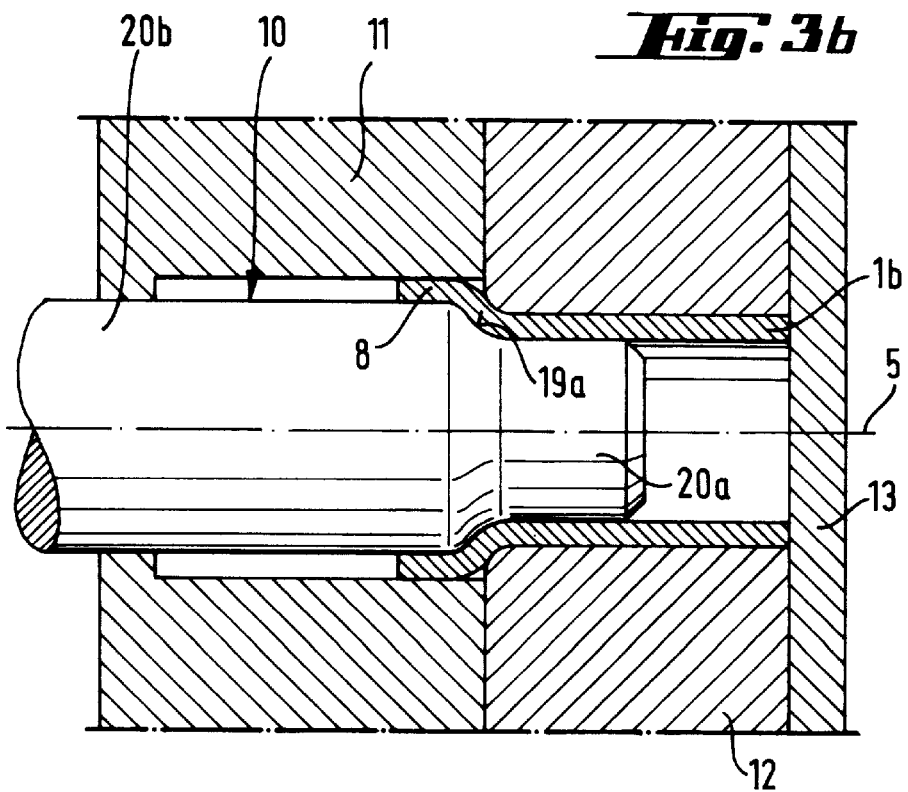

BEARING BUSH AND METHOD FOR THE PRODUCTION THEREOF

BACKGROUND OF THE INVENTION

1. Field of the Invention

The invention relates to a bearing bush having at least one internal annular groove at at least one bush end for accommodating a sealing ring, and a method of producing such a bearing bush.

2. Description of Related Art

Bearing bushes have many uses, e.g. in door hinges, as roller bearing systems, pedal and clutch bearings etc. On the inside, the bearing bush may be coated with a bearing material which exhibits good sliding characteristics and low wear.

However, sliding and wear characteristics may be impaired by the penetration of foreign material into the bearing. Dirt, moisture and particles abraded from adjacent components have a direct effect on the bearing function of the bush, such that the latter may have to be replaced after only a short service life if no special precautions are taken.

In addition, in the case of lubricated bearing bushes the lubricant may escape from the bush, which also causes the sliding characteristics to deteriorate over time.

To remedy this, bushes have already been developed which comprise a groove milled in at one or both ends, into which groove a specially shaped, in general stepped sealing ring is inserted to prevent the penetration of dirt and the like into the bearing. The disadvantage of such bushes is that a certain minimum thickness must be available to enable such a sealing member accommodating groove to be milled in. This process is complex and expensive. Grooves produced by milling also have a rectangular cross section, such that specially shaped sealing rings are required to fit in the milled grooves.

SUMMARY OF THE INVENTION

The object of the invention is therefore to provide a bearing bush which, regardless of the usual thin wall thickness, may be provided with an internal groove in which a conventional sealing member may be inserted and retained. It is also the object of the invention to provide an appropriate manufacturing process.

This object is achieved by means of a bearing bush in which the groove has a curved contour and is located inside an annular bead projecting outwards with respect to the bush body. An annular bead may be produced by a simple upsetting process, without the need for complex internal milling tools. The upsetting process is quick and economical to carry out, which means that the overall manufacturing costs for the bearing bush may be markedly reduced.

The bearing bush may, for example, comprise a backing of steel, on which a bearing alloy is applied. The wall thickness of the bearing bush is the same at all points, i.e. even in the area of the annular bead. The bearing bushes in question are preferably used for rotary movements.

Annular beads have the further advantage that the inner contour is not rectangular, but rather is curved, in particular circular, such that conventional sealing members, e.g. O-rings, may be used. The entire component consisting of bearing bush and seal may thereby be simply produced.

The end face of the bush adjacent the annular bead preferably forms an angle $\alpha$ of between 10° and 80° with the axis of the bush. Inclination of the end face at an angle <10° would make production relatively complicated. The groove in the annular bead has merely to be constructed in such a way that the sealing member is retained. If the angle $\alpha$ is >80°, the sealing member could fall out of the bush. The angular range of from 10 to 80° is therefore particularly suitable for such a bush.

The method according to the invention provides that the bush end to be reshaped to form the annular bead is widened in parallel manner, the widened bush portion is reshaped inwards at its end, such that the end face forms an angle $\alpha$ of between 10° and 80° with the longitudinal axis of the bush and, maintaining the orientation of the end face, the bush is upset to form the annular bead.

BRIEF DESCRIPTION OF THE DRAWINGS

Exemplary embodiments are described in more detail below with the aid of the drawings, in which:

FIGS. 3a to d are schematic representations of the reshaping process carried out by means of a reshaping device shown in vertical section.

DETAILED DESCRIPTION OF THE PREFERRED EMBODIMENT

Figure 1:
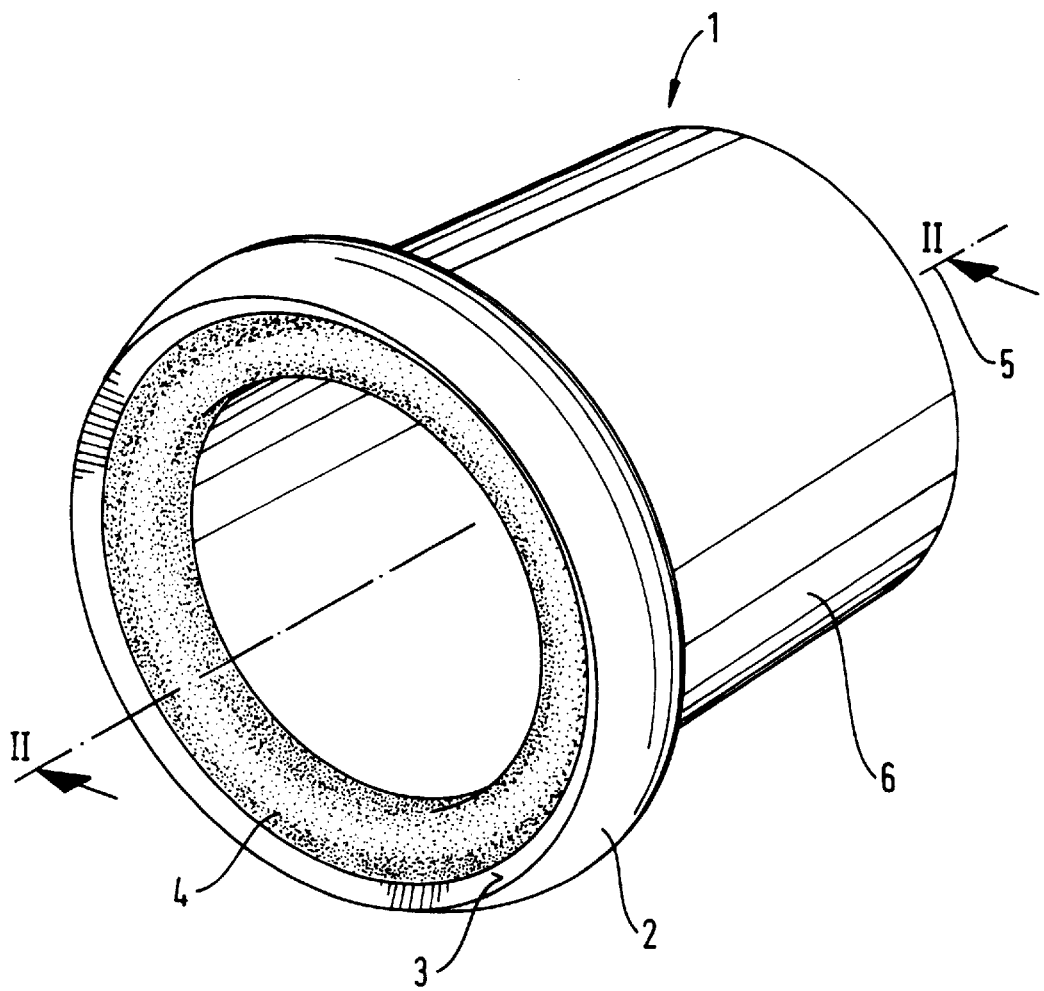
FIG. 1 is a perspective representation of a bush with a bead at the front end.

FIG. 1 shows a bush 1 comprising a cylindrical bush body 6, comprising a longitudinally extending wall at the front end of which there is formed an annular bead 2, which projects radially outwards with respect to the bush body 6. The bush 1 has the same wall thickness at all points including throughout the bead 2. The end face 3 is inclined with respect to the longitudinal axis 5, which inclination may be more clearly seen from FIG. 2. Inside the bead 2 a groove 7 is formed in which an O-ring 4 is inserted as a sealing member.

Figure 2:
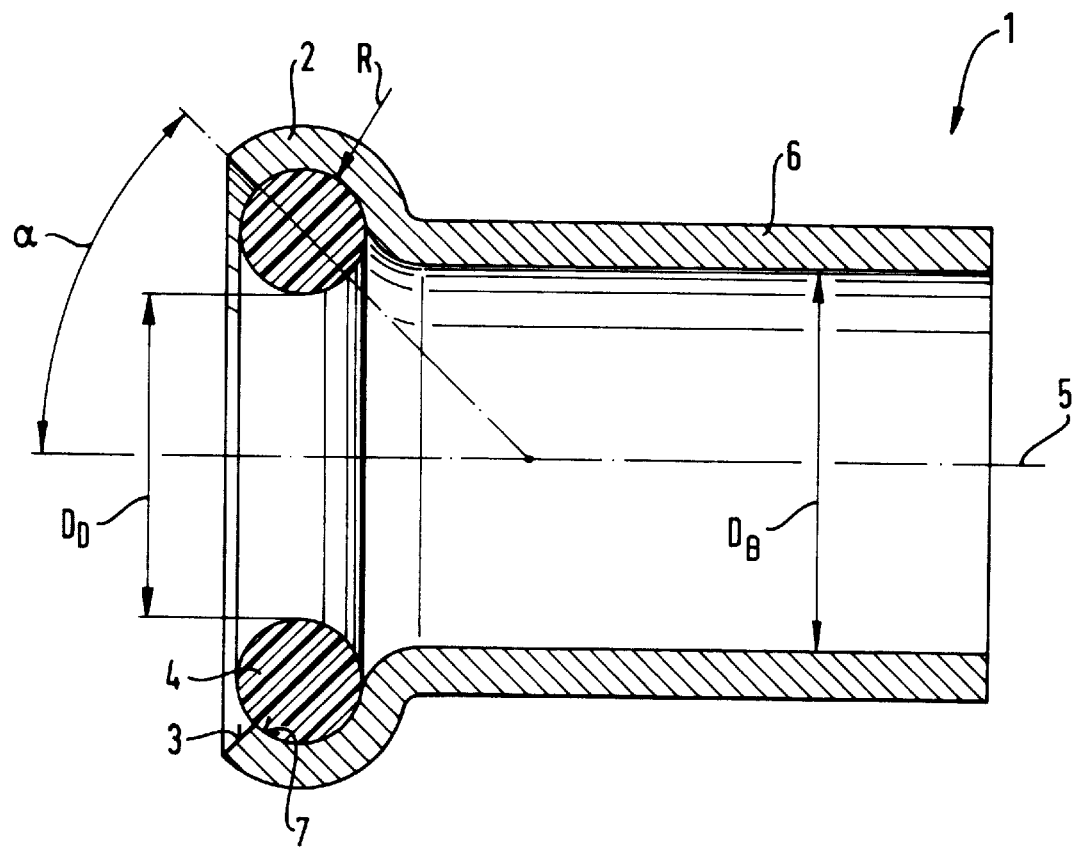
FIG. 2 shows a section through the bush shown in FIG. 1 along line II—II.

FIG. 2 shows a section through the bush shown in FIG. 1. The bead 2 has a circular outer contour and therefore accordingly a circular inner contour groove wall of predetermined size, which forms the groove 7 in which an O-ring 4 is arranged. The end face 3 of the bush 1 forms an angle $\alpha$ with the longitudinal axis 5, said angle $\alpha$ amounting, in the embodiment illustrated here, to 45°. This inclined end face 3 provides the advantage that the O-ring may be simply inserted. The O-ring exhibits a circular cross section which is conformed to the circular curvature and size of the groove 7, such that the sealing member fits tightly against the inside groove wall of the bead 2 in full conforming contact therewith. The radius R illustrated indicates the curvature of the groove 7 and is identical to the radius of the sealing member. The form of the bead 2 is so selected that, taking into account the radius R, the O-ring 4 has a smaller internal diameter $D_D$ than the internal diameter $D_B$ of the bush body, such that, when a bearing shaft or the like is inserted, the O-ring 4 is compressed and its sealing action may thus unfold.

FIG. 3a is a schematic representation of the beginning of the reshaping process, carried out with an appropriate device. A conventional cylindrical bush 1a is located in a first front die 12 and rests with its right-hand end face against an abutment plate 13. The bush 1a projects with respect to the die and extends into a first rear die 11, in which a mandrel 10 is arranged so as to be movable in the direction of the longitudinal axis of the bush 5. The mandrel 10 comprises two portions 20a, b with different diameters, between which a transitional or widening portion 19a is arranged. The mandrel 10 is inserted with its front portion 20a into the bush 1a until the widening portion 19a abuts against the end of the bush. In this area, the diameter of the mandrel 10 increases and the bush 1a is widened upon further penetration of the mandrel 10, as shown in FIG. 3b. So that the bush cannot be deflected outwards in an uncontrolled manner, the first front die 11 acts as a limiter. The distance between the internal wall of the die 11 and the portion 20b of the mandrel 10 is 10 conformed to the bearing wall thickness of the bush 1a. As may be seen in FIG. 3b, a widened, equally cylindrical portion 8 is obtained.

Figure 3C:
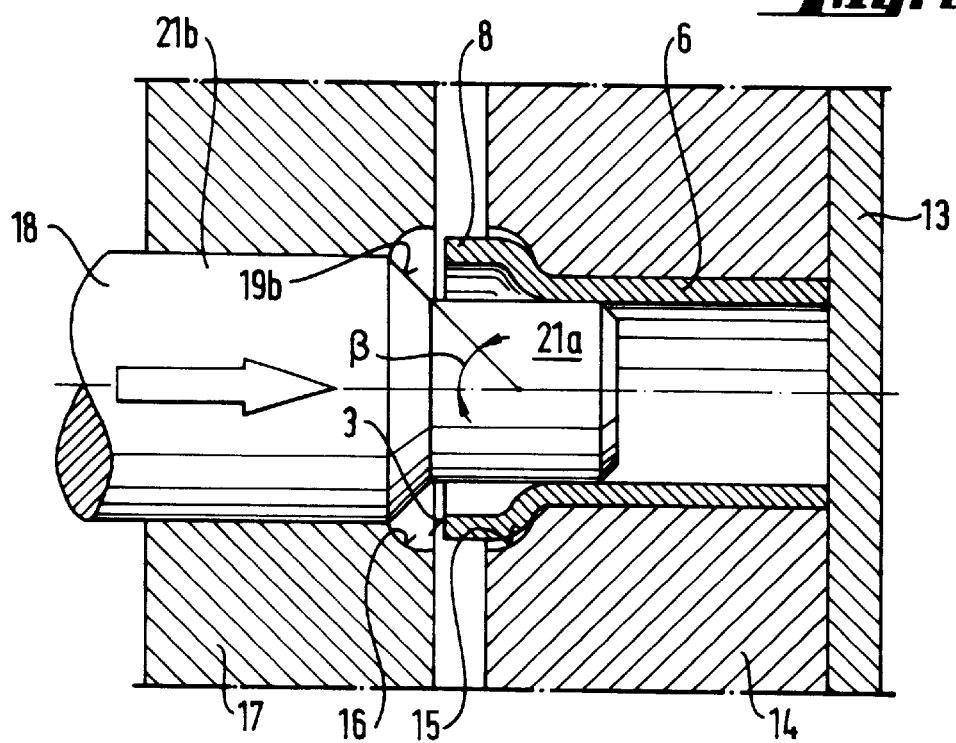
Figure 3D:
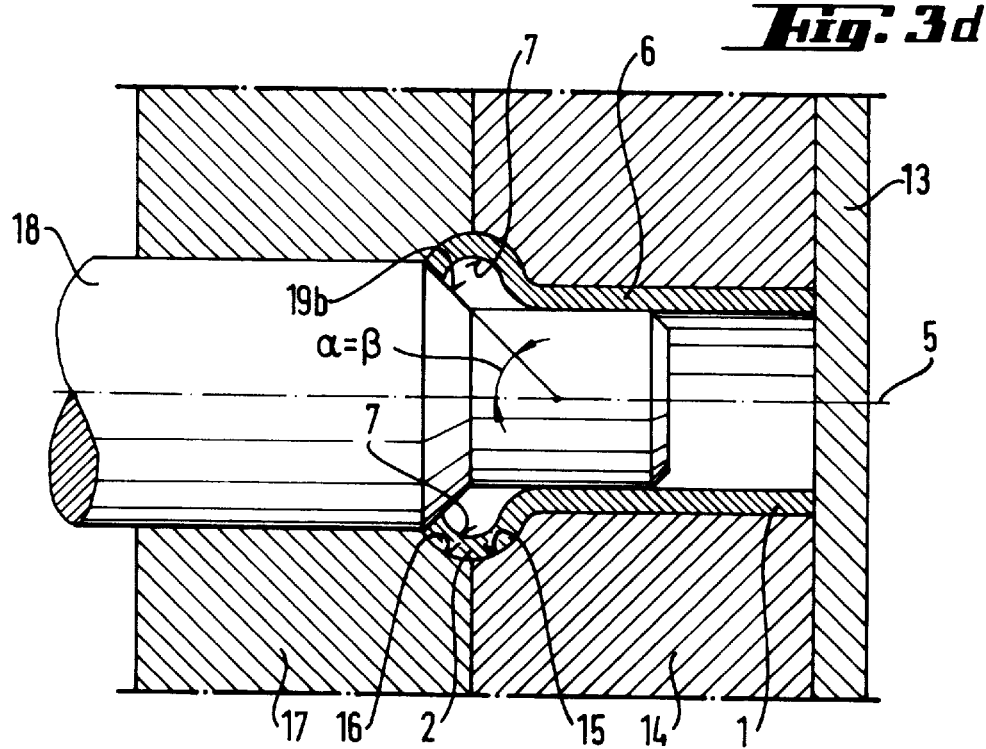

After this first reshaping process, both the mandrel 10 and the dies 11 and 12 are replaced, according to FIG. 3c by a second front and a second rear die 14 and 17, which comprise opposing shaping surfaces 15 and 16 in the form of segments of spheres. A mandrel 18 is used which comprises two portions 21a, b with different diameters and a conical surface 19b in the transitional area. This mandrel is likewise inserted into the bush 1b, wherein the second front die 17 is moved together with the mandrel 18 in the direction of the arrow. At the beginning of the second reshaping step, the widened portion 8 firstly butts with its end face 3 against the shaping surface 16, which directs the front end of the widened portion 8 inwards until the end face 3 rests flat against the conical surface 19b. The inclination of the conical surface 19b is characterised by the angle α, which defines the orientation of the end face 3. For the next part of the shaping process, the end face 3 lies against this conical surface 19b, such that the forces may then be passed into the widened portion 8 via this surface 19b. The subsequent upsetting process forces the widened portion 8 to lie against the shaping surfaces 15 and 16, such that the bead 2 forms, as may be seen from FIG. 3d. The dies 14 and 17 are then removed and the mandrel 18 withdrawn from the bush. The sealing member, e.g. in the form of an O-ring, may then be inserted into the groove 7 in the bush 1 produced in this way.

Obviously, many modifications and variations of the present invention are possible in light of the above teachings. It is, therefore, to be understood that within the scope of the appended claims, wherein reference numerals are merely for convenience and not be in any way limiting, the invention may be practiced otherwise than as specifically described.

What is claimed is:

1. A bearing bush comprising:
   a bush body having a longitudinally extending wall of uniform thickness and at least one end; and
   an annular bead formation of said uniform thickness wall of said body provided at said at least one end thereof defining an inner annular sealing ring-accommodating groove of said body, said bead formation comprising an enlarged portion of said body projecting radially outwardly of said body, said groove having a groove wall with a circular contour in longitudinal section; an O-ring disposed in said groove, said O-ring having a circular cross section conforming in shape and size to said circular contour of said groove wall such that said groove wall is in full conforming contact with said O-ring.

2. The bearing bush of claim 1 wherein said bead comprises a longitudinally upset portion of said body.

3. The bearing bush of claim 1 wherein said body has a longitudinal axis and includes an end face adjacent said bead disposed at an angle of about 10 to 80 degrees to said longitudinal axis of said body.

4. A method of fabricating a bearing bush comprising:
   preparing a bush body having a longitudinally extending wall of uniform thickness and at least one end;
   forming an annular bead on said at least one end of the body projecting radially outwardly of the body defining an inner annular sealing-ring accommodating grove in the body with the groove having a groove wall formed with a circular contour and predetermined size in longitudinal section; and installing an O-ring in the groove having a circular contour and size conforming to that of the groove wall such that the groove wall is in full conforming contact with the O-ring.

5. The method of claim 4 wherein the bead is formed by upsetting the body longitudinally so as to maintain the uniform wall thickness of the body throughout the bead.

6. The method of claim 4 wherein the end of the body is first enlarged uniformly and reshaped inwardly at the end such that an end face of the body at said end thereof forms an angle of between about 10 to 80 degrees with a longitudinal axis of the body.

7. A method of fabricating a bearing bush comprising:
   preparing a bush body having at least one end;
   forming an annular bead on said at least one end of the body projecting radially outwardly of the body defining an inner annular sealing ring-accommodating groove in the body, wherein the end of the body is first enlarged uniformly and reshaped inwardly at the end such that an end face of the body at said end thereof forms an angle of between 10 to 80 degrees with a longitudinal axis of the body.

\* \* \* \* \*